United States Patent
Biddick

(10) Patent No.: US 7,188,029 B1
(45) Date of Patent: Mar. 6, 2007

(54) SYSTEM AND METHOD FOR DETERMINING AND PRESENTING DIFFERENCES IN PLANT PRODUCTIVITY IN VARIABLE LOCATIONS AND ENVIRONMENTS

(75) Inventor: Bradley D. Biddick, Livingston, WI (US)

(73) Assignee: Dido, LLC, Livingston, WI (US)

( * ) Notice: Subject to any disclaimer, the term of this patent is extended or adjusted under 35 U.S.C. 154(b) by 0 days.

(21) Appl. No.: 10/651,409

(22) Filed: Aug. 29, 2003

Related U.S. Application Data

(60) Provisional application No. 60/407,406, filed on Aug. 30, 2002.

(51) Int. Cl.
*G06Q 50/00* (2006.01)

(52) U.S. Cl. .............................. 702/2; 702/5

(58) Field of Classification Search .................. 702/5, 702/2, 3; 701/50
See application file for complete search history.

(56) References Cited

U.S. PATENT DOCUMENTS

| | | | |
|---|---|---|---|
| 5,467,271 A | 11/1995 | Abel et al. | |
| 5,689,418 A | 11/1997 | Monson | |
| 5,699,244 A * | 12/1997 | Clark et al. | 702/2 |
| 5,754,137 A * | 5/1998 | Durrstein | 701/50 |
| 5,919,242 A * | 7/1999 | Greatline et al. | 701/50 |
| 5,955,973 A * | 9/1999 | Anderson | 340/988 |
| 5,991,694 A * | 11/1999 | Gudat et al. | 702/5 |
| 6,002,984 A * | 12/1999 | Aughenbaugh | 702/2 |
| 6,041,582 A * | 3/2000 | Tiede et al. | 56/10.2 A |
| 6,085,135 A * | 7/2000 | Steckel | 701/50 |
| 6,119,531 A * | 9/2000 | Wendte et al. | 73/863.52 |
| 6,141,614 A * | 10/2000 | Janzen et al. | 701/50 |
| 6,199,000 B1 * | 3/2001 | Keller et al. | 701/50 |
| 6,236,907 B1 * | 5/2001 | Hauwiller et al. | 700/283 |
| 6,327,569 B1 * | 12/2001 | Reep | 705/1 |
| 6,336,066 B1 * | 1/2002 | Pellenc et al. | 701/50 |
| RE37,574 E | 3/2002 | Rawlings | |
| 6,385,544 B1 | 5/2002 | Mafra-Neto | |
| 6,386,128 B1 | 5/2002 | Svoboda et al. | |
| 6,401,041 B1 | 6/2002 | Petersen | |
| 6,505,146 B1 * | 1/2003 | Blackmer | 702/189 |
| 6,549,582 B1 * | 4/2003 | Friedman | 375/260 |
| 6,816,878 B1 * | 11/2004 | Zimmers et al. | 709/200 |
| 2001/0011437 A1 * | 8/2001 | Shortridge et al. | 47/58.1 |
| 2002/0022928 A1 * | 2/2002 | Ell | 702/2 |
| 2002/0082982 A1 * | 6/2002 | Mock et al. | 705/37 |
| 2003/0220734 A1 * | 11/2003 | Harrison et al. | 701/208 |

* cited by examiner

*Primary Examiner*—Donald McElheny, Jr.
(74) *Attorney, Agent, or Firm*—Godfrey & Kahn, S.C.

(57) ABSTRACT

A system and method of combining plant productivity testing data with environmental data and geographic data of testing sites in a computer program comprising at least one database for receiving, storing, analyzing and outputting the data.

6 Claims, 21 Drawing Sheets

Access Control

Access allowed to contributed data determined by Contributor of data. Contributor supplies information on who has access on a per test site, per state or per year basis.

| All | DIDO Owners | CORE Group | Trelay | Fontanelle | Stewart |
|-----|-------------|------------|--------|------------|---------|
| ☐   |             | ☐          | ☐      | ☐          | ☐       |
|     |             | Stone      | PANAM  | Doebler    |         |
|     |             | ☐          | ☐      | ☐          |         |

| All | Foundation Cos. | Holdens | SGI | IFIS | MBS | Thurston |     |
|-----|-----------------|---------|-----|------|-----|----------|-----|
| ☐   |                 | ☐       | ☐   | ☐    | ☐   | ☐        | ☐   |

| All | Private Breeders |     |     |     |     |
|-----|------------------|-----|-----|-----|-----|
| ☐   |                  | ☐   | ☐   | ☐   | ☐   |

☐ Change after 1 year.  ☐ Charge for use of data.
☐ Proof before publishing.  ☐ Provide credit for use of data.

Checking the box allows "all" in the named catagory to have access or the individual company to have access. Boxes not checked will NOT have access to the data attached to this form.

Access may be changed as contributors desire. Access by unlisted entities at the time of contribution will need to be determined at the time a new entity desires access.

FIG. 6

Field Listing

Line 1--Name of Contributor
Line 1--Contact Name
Line 1--Contact Phone
Line 1--Contact Email
Line 1--Date of Submission
Line 1--Batch Line 2--NEWLOC

| | |
|---|---|
| Line 3--DIDOLatLongCode | N##.######, W##.###### |
| Line 3--Full Location Code | CC#SS### |
| Line 3--Crop Year | ## |
| Line 3--State | 2 letters |
| Line 3--Contributor Test | text |
| Line 3--CV | ##.# |
| Line 3--LSD | ###.# |
| Line 3--Latitude | N##.###### |
| Line 3--Longitude | W##.###### |
| Line 3--Corner | SE, SW, NE, NW |
| Line 3--LeftFeet | ##### |
| Line 3--RightFeet | ##### |
| Line 3--Grower Name | Text 50 char. |
| Line 3--Grower Zip | ###### |
| Line 3--County of Plot | Text 25 char |
| Line 3--Date Planted | Date format |
| Line 3--Date Harvested | Date format |
| Line 3--Data Source | Field, Plot, Side-by-Side, Rep, Strip, Monitor |
| Line 3--Entries | #### |
| Line 3--Reps | # (1-2-3) |
| Line 3--Row Width | ## (4-40) |
| Line 3--Previous Crop | Corn, soy, alf, wheat, milo, fallow, meadow |
| Line 3--Tillage | notil, mintil, conv, ridge, zone, other) |
| Line 3--Water | Irrigated, non-irrigated, dryland, fallow) |

FIG. 8A

Field Listing (Cont.)

| | |
|---|---|
| Line 3--Soil Type | Clay, silty clay, silty clay loam, loam, silt loam, sandy loam, sand, clay loam) |
| Line 3--pH | acid, neu-acid, neutral, neu-alkaline, alkaline |
| Line 3--Fertility | Very High, High, Medium, Low, Very Low |
| Line 3--OM | Very High, High, Medium, Low, Very Low |
| Line 3--Lay of Land | Strips, riverbottom, sidehill, hilltop, plateau |
| Line 3--Drainage | well, poorly, very poorly |
| Line 3--Tiled | Y, N |
| Line 3--Fert N | ### pounds- 0 if none |
| Line 3--Fert P | ### pounds- 0 if none |
| Line 3--Fert K | ### pounds- 0 if none |
| Line 3--Fert S | ### pounds- 0 if none |
| Line 3--Fert Z | ### pounds- 0 if none |
| Line 3--Insecticide | Text 50 char |
| Line 3--Insect Control Rating | # (1-9) |
| Line 3--Herbicide | Text 50 char |
| Line 3--Weed Control Rating | # (1-9) |
| Line 3--Stress Rating | # (1-9) |
| Line 3--Stress Notes | Text |
| Line 3--Unusual Conditions | Text |
| Line 3--Added notes | Text |
| Line 3--Batch | Text |
| | |
| Line 4--DidoLatLongCode | N##.######, W###,###### |
| Line 4--Entry Number | ##### |
| Line 4--Hybrid Name | text (brand & hyb number) |
| Line 4--Hybrid Number | text (if separate in contributors data) |
| Line 4--Brand | text (if separate in contributors data) |
| Line 4--Pedigree | text |
| Line 4--Yield | ###.# (0-400 corrected to 15%) |
| Line 4--Moisture | ##.# (8-45 |
| Line 4--Pop | ###### (5000-60000) |
| Line 4--SL% | ##.# (%) |

FIG. 8B

Field Listing (Cont.)

| | |
|---|---|
| Line 4--RL% | ##.# (%) |
| Line 4--DE% | ##.# (%) |
| Line 4--Plant Ht | ### (inches 50-150) |
| Line 4--Ear Ht | ## (inches 0-90) |
| Line 4--TestWt | ##.# (35-70) |
| Line 4--Stay Green | # (1-9) |
| Line 4--Harvest Score | # (1-9) |
| Line 4--CV per Entry | ##.# |
| Line 4--Batch | Text |

DIDO fields:

| | |
|---|---|
| DIDOLatLongCode | N##.######, W##.###### |
| DIDO Soil Code | text |
| DIDO Soil Name | text |
| DIDO Soil Type | text |
| DIDO Soil Capability Unit Dryland | text |
| DIDO Soil Capability Unit Irrigated | text |
| DIDO Slope | text (0-2, 2-6, 6-12, 12-20, 20-30) |
| DIDO Drainage | text |
| DIDO County | text |
| DIDO Zip-Plot | ###### |
| DIDO Elevation | ##### (feet) |
| DIDO MLRA | Text 10, etc.) |
| DIDO LRU | Text (105 etc.) |
| DIDO LRR | Text (L, etc.) |
| DIDO Holden Zone | # (1-9) |
| DIDO EastWest Zone | text |
| DIDOGDD % of Normal | ###.# (percentage) |
| DIDO Rainfall % of Normal | ###.# (percentage) |
| DIDO Corn Potential Quotient | DIDO formula |
| DIDO YieldBase10 | ###.# (county 10 year average) |
| DIDO YieldBase4 | ###.# (county 4 year average) |
| DIDO Batch | text |

FIG. 8C

| Separators_T | | | |
|---|---|---|---|
| Column Name | Data Type | Length | Allow Nulls |
| SE_Company_ID | int | 4 | |
| SE_Separator_ID | int | 4 | |
| SE_Separator_VC | varchar | 3 | |
| SE_SurroundedByBlanks_B | bit | 1 | |
| SE_AfterInbredNumber_IN | int | 4 | ✓ |

— 88

| ValidStates_T | | | |
|---|---|---|---|
| Column Name | Data Type | Length | Allow Nulls |
| VS_StatePostalCode_CH | char | 2 | |
| VS_StateNumber_CH | char | 2 | |
| VS_StateName_VC | varchar | 30 | |

— 90

| ValidValues_T | | | |
|---|---|---|---|
| Column Name | Data Type | Length | Allow Nulls |
| W_FieldName_VC | varchar | 35 | |
| W_XMLTag_VC | varchar | 25 | |
| W_SubTable_VC | varchar | 10 | |
| W_NullAllowed_BT | bit | 1 | |
| W_LowValue_DC | decimal | 9 | ✓ |
| W_HighValue_DC | decimal | 9 | ✓ |
| W_Text1_VC | varchar | 50 | ✓ |
| W_Text2_VC | varchar | 50 | ✓ |
| W_Text3_VC | varchar | 50 | ✓ |
| W_Text4_VC | varchar | 50 | ✓ |
| W_Text5_VC | varchar | 50 | ✓ |
| W_Text6_VC | varchar | 50 | ✓ |
| W_Text7_VC | varchar | 50 | ✓ |
| W_Text8_VC | varchar | 50 | ✓ |
| W_Text9_VC | varchar | 50 | ✓ |
| W_Text10_VC | varchar | 50 | ✓ |
| W_Text11_VC | varchar | 50 | ✓ |
| W_Text12_VC | varchar | 50 | ✓ |
| W_Text13_VC | varchar | 50 | ✓ |
| W_Text14_VC | varchar | 50 | ✓ |
| W_Text15_VC | varchar | 50 | ✓ |
| W_Text16_VC | varchar | 50 | ✓ |
| W_Text17_VC | varchar | 50 | ✓ |
| W_Text18_VC | varchar | 50 | ✓ |
| W_Text19_VC | varchar | 50 | ✓ |
| W_Text20_VC | varchar | 50 | ✓ |

Statistics_T — 94

| Column Name | Data Type | Length | Allow Nulls |
|---|---|---|---|
| ST_Company_ID | int | 4 | |
| ST_CropYear_IN | int | 4 | ✓ |
| ST_LOCsImported_IN | int | 4 | ✓ |
| ST_VarietysImported_IN | int | 4 | ✓ |
| ST_LOCsExported_IN | int | 4 | ✓ |
| ST_VarietysExported_IN | int | 4 | ✓ |
| ST_Logins_IN | int | 4 | ✓ |
| ST_AdminLogins_IN | int | 4 | ✓ |

LoginAttempts_T — 96

| Column Name | Data Type | Length | Allow Nulls |
|---|---|---|---|
| LA_LoginAttempts_ID | int | 4 | |
| LA_Company_ID | int | 4 | ✓ |
| LA_Login_VC | varchar | 10 | |
| LA_PIN_VC | varchar | 10 | |
| LA_DateTime_DT | datetime | 8 | |
| LA_LoginFails_IN | int | 4 | |
| LA_PINFails_IN | int | 4 | |
| LA_FailReason_VC | varchar | 50 | ✓ |

LicenseAgreement_T — 98

| Column Name | Data Type | Length | Allow Nulls |
|---|---|---|---|
| LA_License_ID | char | 10 | |
| LA_LicenseText_TX | text | 16 | |

FIG. 9B

| Company_T | | | |
|---|---|---|---|
| Column Name | Data Type | Length | Allow Nulls |
| CO_Company_ID | int | 4 | |
| CO_Login_VC | varchar | 10 | |
| CO_Name_VC | varchar | 50 | |
| CO_Address_VC | varchar | 50 | ✓ |
| CO_City_VC | varchar | 30 | ✓ |
| CO_State_VC | varchar | 2 | ✓ |
| CO_Zip_VC | varchar | 9 | ✓ |
| CO_Phone_VC | varchar | 10 | |
| CO_Fax_VC | varchar | 10 | ✓ |
| CO_Contact_VC | varchar | 50 | |
| CO_ContactPhone_VC | varchar | 10 | |
| CO_ContactEmail_VC | varchar | 50 | ✓ |
| CO_SecondContact_VC | varchar | 50 | ✓ |
| CO_SecondContactPhone_VC | varchar | 10 | ✓ |
| CO_SecondContactEmail_VC | varchar | 50 | ✓ |
| CO_UploadDownloadFileType_CH | char | 1 | |
| CO_UploadFileName_VC | varchar | 50 | |
| CO_DownloadFileName_VC | varchar | 50 | |
| CO_HybridNameIncludesBrand_BT | bit | 1 | |
| CO_HybridBrandIsFirstCharacter_BT | bit | 1 | |
| CO_HybridNumberBeforeBrand_BT | bit | 1 | |
| CO_InbredsAreAlphanumeric_BT | bit | 1 | |
| CO_AdministratorPIN_VC | varchar | 10 | |
| CO_UserPIN_VC | varchar | 10 | ✓ |

BrandAbbreviation_T — 102

| Column Name | Data Type | Length | Allow Nulls |
|---|---|---|---|
| BA_Company_ID | int | 4 | |
| BA_Abbreviation_VC | varchar | 10 | |
| BA_Brand_VC | varchar | 50 | |
| BA_Preferred_CH | char | 1 | |
| BA_NameBeforeAfterNumber_CH | char | 1 | |
| BA_UpLowOrAllUpper_CH | char | 1 | |

DataSpecs_T — 104

| Column Name | Data Type | Length | Allow Nulls |
|---|---|---|---|
| DS_Company_ID | int | 4 | |
| DS_DataName_VC | varchar | 50 | |
| DS_XMLTag_VC | varchar | 50 | |
| DS_DataSetName_VC | varchar | 50 | |
| DS_TextLine_IN | int | 4 | |
| DS_TextField_IN | int | 4 | |
| DS_LastField_BT | bit | 1 | |

FIG. 9D

| LOC_T | | | |
|---|---|---|---|
| Column Name | Data Type | Length | Allow Nulls |
| LO_LOC_ID | int | 4 | |
| LO_Company_ID | int | 4 | |
| LO_FullLocationCode_CH | char | 8 | ✓ |
| LO_FLCCropYear_CH | char | 1 | ✓ |
| LO_FLCState_CH | char | 2 | ✓ |
| LO_FLCMaturityZone_CH | char | 1 | ✓ |
| LO_FLCWCE_CH | char | 1 | ✓ |
| LO_FLCTestType_CH | char | 1 | ✓ |
| LO_FLCTestNumber_CH | char | 2 | ✓ |
| LO_CropYear_CH | char | 2 | ✓ |
| LO_State_CH | char | 2 | ✓ |
| LO_TestNumber_VC | varchar | 20 | ✓ |
| LO_Latitude_DC | decimal | 9 | ✓ |
| LO_Longitude_DC | decimal | 9 | ✓ |
| LO_Corner_CH | char | 2 | ✓ |
| LO_FeetToLeftCorner_IN | int | 4 | ✓ |
| LO_FeetToRightCorner_IN | int | 4 | ✓ |
| LO_Elevation_IN | int | 4 | ✓ |
| LO_GrowerName_VC | varchar | 50 | ✓ |
| LO_ZipCode_VC | varchar | 10 | ✓ |
| LO_County_VC | varchar | 25 | ✓ |
| LO_DatePlanted_DT | datetime | 8 | ✓ |
| LO_DateHarvested_DT | datetime | 8 | ✓ |
| LO_DataSource_VC | varchar | 50 | ✓ |
| LO_Entries_IN | int | 4 | ✓ |
| LO_Reps_IN | int | 4 | ✓ |
| LO_RowWidth_IN | int | 4 | ✓ |

| LOCPermissions_T | | | |
|---|---|---|---|
| Column Name | Data Type | Length | Allow Nulls |
| LP_LOCPermission_ID | int | 4 | |
| LP_OwnerCompany_ID | int | 4 | |
| LP_ViewerCompany_ID | int | 4 | ✓ |
| LP_LOC_ID | int | 4 | ✓ |
| LP_FullLocationCode_CH | char | 1 | ✓ |
| LP_FLCCropYear_CH | char | 1 | ✓ |
| LP_FLCState_CH | char | 1 | ✓ |
| LP_FLCMaturityZone_CH | char | 1 | ✓ |
| LP_FLCWCE_CH | char | 1 | ✓ |
| LP_FLCTestType_CH | char | 1 | ✓ |
| LP_FLCTestNumber_CH | char | 1 | ✓ |
| LP_CropYear_CH | char | 1 | ✓ |
| LP_State_CH | char | 1 | ✓ |
| LP_TestNumber_CH | char | 1 | ✓ |
| LP_Latitude_CH | char | 1 | ✓ |
| LP_Longitude_CH | char | 1 | ✓ |
| LP_Corner_CH | char | 1 | ✓ |
| LP_FeetToLeftCorner_CH | char | 1 | ✓ |
| LP_FeetToRightCorner_CH | char | 1 | ✓ |
| LP_Elevation_CH | char | 1 | ✓ |
| LP_GrowerName_CH | char | 1 | ✓ |
| LP_ZipCode_CH | char | 1 | ✓ |
| LP_County_CH | char | 1 | ✓ |
| LP_DatePlanted_CH | char | 1 | ✓ |
| LP_DateHarvested_CH | char | 1 | ✓ |
| LP_DataSource_CH | char | 1 | ✓ |
| LP_Entries_CH | char | 1 | ✓ |
| LP_Reps_CH | char | 1 | ✓ |
| LP_RowWidth_CH | char | 1 | ✓ |
| LP_PreviousCrop_CH | char | 1 | ✓ |
| LP_Tillage_CH | char | 1 | ✓ |
| LP_Water_CH | char | 1 | ✓ |
| LP_SoilType_CH | char | 1 | ✓ |
| LP_PH_CH | char | 1 | ✓ |
| LP_Fertility_CH | char | 1 | ✓ |
| LP_OrganicMatter_CH | char | 1 | ✓ |
| LP_LayOfLand_CH | char | 1 | ✓ |
| LP_Slope_CH | char | 1 | ✓ |
| LP_Drainage_CH | char | 1 | ✓ |
| LP_Tiled_CH | char | 1 | ✓ |
| LP_CSR_CH | char | 1 | ✓ |
| LP_YieldBase_CH | char | 1 | ✓ |
| LP_Fertilizer_CH | char | 1 | ✓ |
| LP_Insecticide_CH | char | 1 | ✓ |
| LP_InsectControlRating_CH | char | 1 | ✓ |
| LP_Herbicide_CH | char | 1 | ✓ |
| LP_WeedControlRating_CH | char | 1 | ✓ |
| LP_StressRating_CH | char | 1 | ✓ |
| LP_StressNotes_CH | char | 1 | ✓ |
| LP_GDD_CH | char | 1 | ✓ |
| LP_Rainfall_CH | char | 1 | ✓ |
| LP_SeasonalUnusual_CH | char | 1 | ✓ |
| LP_AdditionalNotes_CH | char | 1 | ✓ |
| LP_AvailableForSearch_CH | char | 1 | ✓ |

FIG. 9F

Variety_T

| Column Name | Data Type | Length | Allow Nulls |
|---|---|---|---|
| VA_Variety_ID | int | 4 | |
| VA_EntryNumber_IN | int | 4 | ✓ |
| VA_LOC_ID | int | 4 | |
| VA_PrevHybridName_ID | int | 4 | ✓ |
| VA_HybridNumber_VC | varchar | 10 | ✓ |
| VA_Brand_VC | varchar | 50 | ✓ |
| VA_OriginalHybridName_V | varchar | 50 | ✓ |
| VA_PrevPedigree_ID | int | 4 | ✓ |
| VA_Inbred0_VC | varchar | 12 | ✓ |
| VA_Inbred1_VC | varchar | 12 | ✓ |
| VA_Inbred2_VC | varchar | 12 | ✓ |
| VA_Inbred3_VC | varchar | 12 | ✓ |
| VA_Inbred4_VC | varchar | 12 | ✓ |
| VA_Inbred5_VC | varchar | 12 | ✓ |
| VA_OriginalPedigree_VC | varchar | 50 | ✓ |
| VA_Yield_DC | decimal | 9 | ✓ |
| VA_Moisture_DC | decimal | 9 | ✓ |
| VA_YMQuotient_DC | decimal | 9 | ✓ |
| VA_Population_IN | int | 4 | ✓ |
| VA_StalkLodgingPct_DC | decimal | 9 | ✓ |
| VA_RootLodgingPct_DC | decimal | 9 | ✓ |
| VA_DroppedEarPct_DC | decimal | 9 | ✓ |
| VA_PlantHeight_IN | int | 4 | ✓ |
| VA_EarHeight_IN | int | 4 | ✓ |
| VA_TestWeight_DC | decimal | 9 | ✓ |
| VA_StayGreen_IN | int | 4 | ✓ |
| VA_HarvestScore_IN | int | 4 | ✓ |
| VA_AvailableForSearch_B | bit | 1 | ✓ |

| VarietyPermissions_T | | | |
|---|---|---|---|
| Column Name | Data Type | Length | Allow Nulls |
| VP_VarietyPermissions_ID | int | 4 | |
| VP_OwnerCompany_ID | int | 4 | |
| VP_ViewerCompany_ID | int | 4 | ✓ |
| VP_LOC_ID | int | 4 | ✓ |
| VP_Variety_ID | int | 4 | ✓ |
| VP_EntryNumber_CH | char | 1 | ✓ |
| VP_HybridName_CH | char | 1 | ✓ |
| VP_HybridNumber_CH | char | 1 | ✓ |
| VP_Brand_CH | char | 1 | ✓ |
| VP_Pedigree_CH | char | 1 | ✓ |
| VP_Inbred1_CH | char | 1 | ✓ |
| VP_Inbred2_CH | char | 1 | ✓ |
| VP_Inbred3_CH | char | 1 | ✓ |
| VP_Inbred4_CH | char | 1 | ✓ |
| VP_Inbred5_CH | char | 1 | ✓ |
| VP_Inbred6_CH | char | 1 | ✓ |
| VP_Yield_CH | char | 1 | ✓ |
| VP_Moisture_CH | char | 1 | ✓ |
| VP_YMQuotient_CH | char | 1 | ✓ |
| VP_Population_CH | char | 1 | ✓ |
| VP_StalkLodgingPct_CH | char | 1 | ✓ |
| VP_RootLodgingPct_CH | char | 1 | ✓ |
| VP_DroppedEarPct_CH | char | 1 | ✓ |
| VP_PlantHeight_CH | char | 1 | ✓ |
| VP_EarHeight_CH | char | 1 | ✓ |
| VP_TestWeight_CH | char | 1 | ✓ |
| VP_StayGreen_CH | char | 1 | ✓ |
| VP_HarvestScore_CH | char | 1 | ✓ |

HybridName_T

| Column Name | Data Type | Length | Allow Nulls |
|---|---|---|---|
| HN_Company_ID | int | 4 | |
| HN_HybridName_ID | int | 4 | |
| HN_OriginalName_VC | varchar | 50 | |
| HN_Brand_VC | varchar | 50 | |
| HN_Number_VC | varchar | 10 | |
| HN_PreviousHybridName_ID | int | 4 | ✓ |

—114

Pedigree_T

| Column Name | Data Type | Length | Allow Nulls |
|---|---|---|---|
| PE_Company_ID | int | 4 | |
| PE_Pedigree_ID | int | 4 | |
| PE_OriginalPedigree_VC | varchar | 50 | |
| PE_Inbred0_VC | varchar | 50 | |
| PE_Inbred1_VC | varchar | 50 | ✓ |
| PE_Inbred2_VC | varchar | 50 | ✓ |
| PE_Inbred3_VC | varchar | 50 | ✓ |
| PE_Inbred4_VC | varchar | 50 | ✓ |
| PD_Inbred5_VC | varchar | 50 | ✓ |
| PE_PreviousPedigree_ID | int | 4 | ✓ |

SYSTEM AND METHOD FOR DETERMINING AND PRESENTING DIFFERENCES IN PLANT PRODUCTIVITY IN VARIABLE LOCATIONS AND ENVIRONMENTS

CROSS REFERENCE TO RELATED APPLICATIONS

This application claims priority to U.S. Provisional Application No. 60/407,406 filed Aug. 30, 2002, which is incorporated herein in its entirety by reference.

BACKGROUND OF THE INVENTION

The present invention relates generally to plant productivity testing, and more particularly to a system and method of combining plant productivity testing data with environmental data and geographic data of testing sites in a computer program comprising at least one database for receiving, storing, analyzing and outputting the data.

Foundation seed companies and private plant breeding companies are in the business of developing seed products from seed producing plants. This is mainly accomplished through foundation seed company testing programs and private plant breeding programs. However, all of the data is separate and different, and they all publish it in their own way. There is currently no method to connect the data.

Historically, the testing of plant productivity and the response of plants to environmental variables has been conducted in replicated research plots, conditions that favor high yields, on farm test plots and third party yield trials. With no environment measure, researchers are hesitant to test in a variety of conditions. Plant population and design of the plots has been controlled, to a degree, but many variables have not been recorded or cannot be easily and accurately collected. Another problem is that much of the data is proprietary and not available for analysis. Proprietary testing systems have also made it difficult to compare differences in plant productivity.

Genetic developers, such as foundation seed companies and private plant breeding programs, have generated volumes of data documenting yield, grain moisture content, lodging and disease response. Traditionally, testing sites have been chosen based on availability of these sites, a desire to geographically separate the tests, a need for conducting tests in a variety of climates, a need for comparing irrigated versus non-irrigated conditions, and upon budgetary limits. Most of all, there has been a propensity to test in environments that will make seed products look good.

Presently, data related to plant productivity are generally available in large books and digital databases or spreadsheets. Each foundation seed company and private breeding program documents its own proprietary data in individually developed formats. There is little commonality in the data except for possibly statistical analysis, yield notation and harvest moisture. There is no accurate method to analyze data between different data sources.

Huge volumes of data are being produced by seed company testing programs and plant breeding programs. More data is being generated about more seed products than ever before, yet no method or process exists to combine and analyze the data. Large books and binders of expensive data from seed companies are piled on dusty shelves. The ability to view combined data generated by different entities does not exist.

With the explosion in the number of seed products, it will only become more difficult to make product choices. Typically, seed product selection rests on recommendations and environmental trial and error. This is at a time when mistakes will be more harmful as growers demand performance from higher priced products.

Therefore, there is a need for a system and method of pulling all of the plant productivity data from foundation seed companies and private plant breeding companies and combining it with relevant environmental and geographic data of the test sites for analysis in a single computer program.

SUMMARY OF THE INVENTION

The present invention is a system and method of combining plant productivity testing data with environmental data and geographic data of testing sites in a computer program comprising at least one database for receiving, storing, analyzing and outputting the data. Software has been developed for a new process of coupling geographic data to product performance data. This data is stored in a plurality of databases. Data contributors, while controlling access to their data, will experience more exposure of their seed product data through the use of the present invention.

The present invention was developed to address several shortcomings of traditional data systems and to control access to data in a way that will attract data gathering. The present invention originated from a need to better organize and more fully comprehend all of the data available to foundation seed companies and private plant breeder programs, and analyze the data faster. Furthermore, the present invention enhances traditional data by adding very site specific characteristics, historical yield information such as geographic elevation, soil type characteristics and weather information. The present invention couples geographic information and product information with the accuracy of a GPS system. It combines the accuracy of GPS with the accuracy of research testing equipment and systems.

The system of the present invention combines experimental seed product data (plant productivity data) from research testing (seed company testing programs (test plots) and plant breeding programs) with environmental data and geographic data (GPS lat-long). The system of the present invention adds geographic data of the test site to product test data from the test site.

The present invention has advantages over the prior art, including enhancing traditional data by adding very site specific characteristics, such as latitude and longitude of test sites, geographic elevation, soil type characteristics and weather information, soil conditions data, soil gradient data, topological data, meteorological data, remote sensing satellite data, plant genetic data, plant productivity data, irrigation data, lodging and disease response data, and grain moisture content data, etc.

The present invention takes unlike data from various sources, combines it and exports it in a like format. The present invention makes new uses of and extracts new value from older, existing sources of historical data.

The present invention also makes it possible to come up with a yield potential quotient for certain areas and certain seed products.

The goal of the present invention is to attract seed and plant performance data, add related geographic data and provide it back to contributors, as well as seed companies and other interested entities. Hybrid and variety selection will be improved through the use of the present invention. And it will lead to a higher level of confidence when making product placement decisions.

Uses of the present invention include: product selection, product descriptions, product placement, sales support, testing site selection, alternate method of data publication, controlled exposure of data, geographic understanding of product/environment interactions, better understanding of grower environments, and more use of data due to ease and convenience.

Key features of the invention include: allows the contributor to control access to its own data, allows the contributor to control the level of geographic disclosure, provides data back in the same format as data is contributed, requires little or no change to in-house data systems, operates with extreme security, adds geographic data of the site to product testing data, and will account for contributions (data in) and extractions (data out) with the ability to apply charges and tracking of use if desired.

The present invention provides the following advantages over the prior art.

Data is contributed in a consistent format of the contributor's choosing.

Data is held in a consistent manner across all contributors.

Data is extracted in the same consistent format as contributed.

Format of the data may be unique to the contributor.

Data contributors control which other contributors or data extractors may have access to their data.

Data contributors may extract more or less data than they contribute.

Approved data extractors may extract as much data as desired.

Data contribution and extraction is recorded with credits earned and charges billed for use in relation to contribution.

The present invention is built to contain data from any and all foundation seed companies and private breeding programs and seed company testing programs.

Extreme security surrounds the invention in order to gain the confidence of contributors and data extractors through the use of software and/or hardware using changeable passwords every minute.

Additional data is added to "normal test plot results" by documenting the latitude and longitude of the test sites.

With highly accurate test site determination many valuable environmental factors can be directly connected to the test results.

Ease of use is maintained by providing data back to a contributor in the format the data was provided. This does not require the contributor to abandon an expensive in-house data system.

Ease of use at the extractor/contributor level is achieved by providing enhanced data in a consistent format.

Accordingly, it is an object of the present invention to provide a data system that is larger, easier to use and highly enhanced over any other data source available.

Various other features, objects, and advantages of the invention will be made apparent to those skilled in the art from the following detailed description, claims, and accompanying drawings.

BRIEF DESCRIPTION OF THE DRAWINGS

FIG. 6 is an example of an access control worksheet to be filled out by each data contributor and input into the system for limiting access by data extractors to the data contributor's data;

FIG. 8A is a listing of fields per related database in the system of the present invention;

FIG. 8B is a continuation of the listing of fields per related database in the system of the present invention;

FIG. 8C is a continuation of the listing of fields per related database in the system of the present invention;

FIG. 9A is a diagram illustrating the fields within the Separators, ValidStates and ValidValues databases of the system of the present invention;

FIG. 9B is a diagram illustrating the fields within the Statistics, LoginAttempts and LicenseAgreement databases of the system of the present invention;

FIG. 9C is a diagram illustrating the fields within the Company database of the system of the present invention;

FIG. 9D is a diagram illustrating the fields within the BrandAbbreviation and DataSpecs databases of the system of the present invention;

FIG. 9E is a diagram illustrating the fields within the LOC database of the system of the present invention;

FIG. 9F is a diagram illustrating the fields within the LOCPermissions database of the system of the present invention;

FIG. 9G is a diagram illustrating the fields within the Variety database of the system of the present invention;

FIG. 9H is a diagram illustrating the fields within the VarietyPermissions database of the system of the present invention; and FIG. 9J is a diagram illustrating the fields within the HybridName and Pedigree databases of the system of the present invention.

Many of the Figures use the acronym DIDO (Data In Data Out) to represent the system of the present invention.

DETAILED DESCRIPTION OF THE INVENTION

Figure 1:
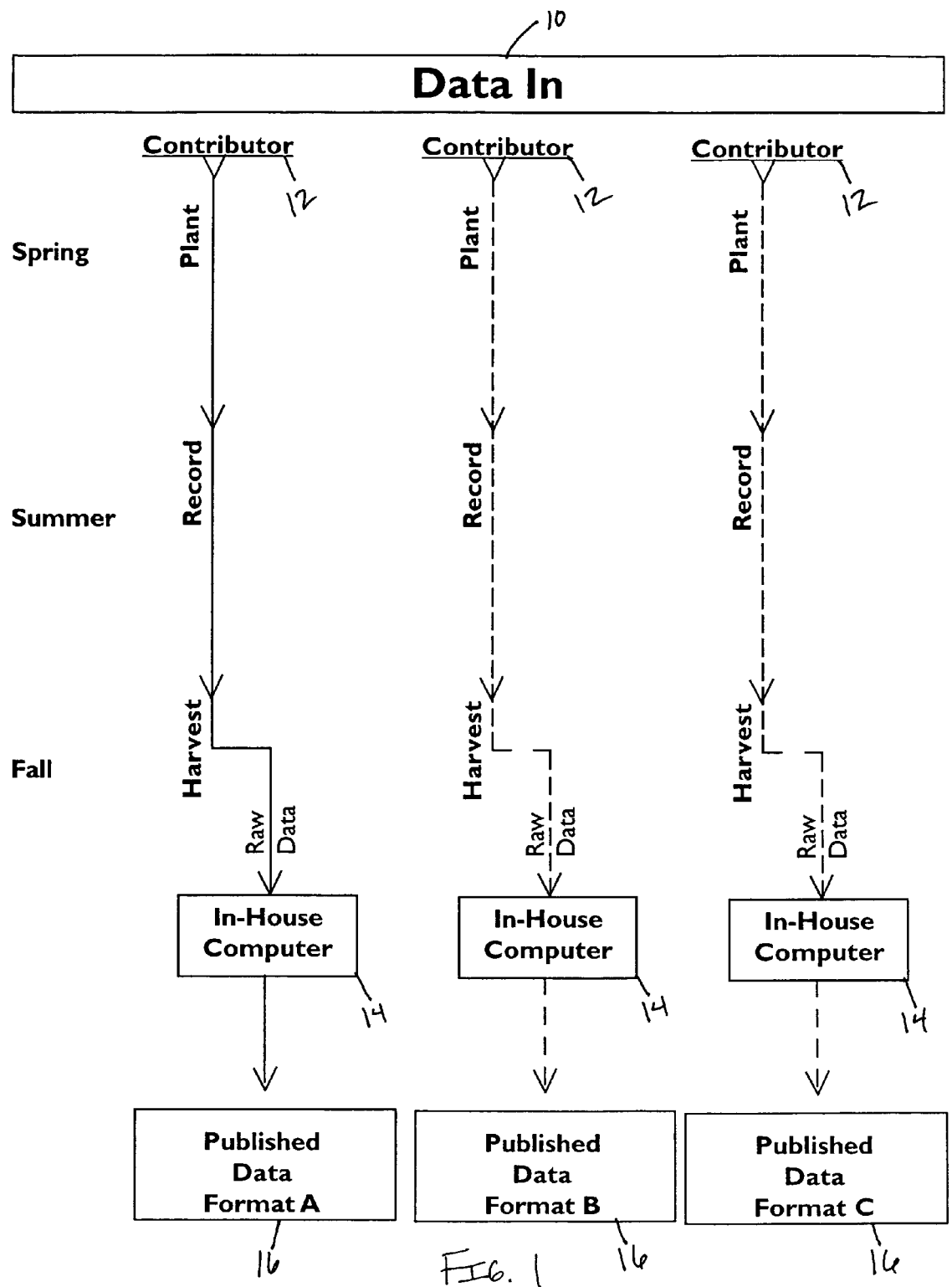
FIG. 1 is a flow diagram showing the flow of data in prior art systems.

Referring now to the drawings, FIG. 1 illustrates a plurality of prior art data systems in which a plurality of data contributors input data into their systems' in-house computer and each publish the data in unique formats. Each data system is run independently from each other and they all output a different version of published data. So what you have is a lot of data in different formats that nobody is looking at. A data contributor may contribute data to their in-house computer during various stages related to the plant growing conditions. For example, a data contributor may contribute data and input that data into their in-house computer during the planting, growing and harvesting season.

The present invention comprises a computer program loaded on a computer server or available on CDs, DVDs, or over the Internet, with a plurality of databases for storing plant productivity data, environmental data and geographic data and an authentication device. A plurality of data contributors input data into the system, while a plurality of data extractors may view, analyze or output data. Some or all of the data contributors may also be data extractors. The geographic and environmental data may be collected with the use of GPS devices, USDA Soil Conservation Service soil surveys, USDA historical county yield information, NOAA weather information, maps, mapping software, and a specific set of data fields.

The present invention can be described as a data pool organized as a relational database that contains data contributed by individual genetic testing entities. Extraction of the data is the resulting benefit as more data is accessible to a particular user than was contributed by that user, while the contributors maintain control over which other users have access to their proprietary data. Genetic suppliers can also gain more exposure to their products while having the choice to generate income from proprietary data. Data contributors can maintain current limited data access without modifying present software.

Data related to plant productivity and growing conditions may include soil conditions data, soil gradient data, topological data, elevation of the site, meteorological data, remote sensing satellite data, data related to temperature and moisture, plant genetic data, yield, irrigation data, lodging and disease response data, and grain moisture content data. Geographical data is preferably collected with the aid of a Global Positioning System ("GPS") device. The geographic data is useful for giving the geographic location of a particular field in which the plant is to be grown, including the latitude and longitude and ZIP Code of the particular field plot.

Plant productivity data refers to all data that is related to plant growing conditions, including historical data obtained from counties and experimental data such as yield, moisture, lodging, soil characteristics, soil conditions data, soil gradient data, topological data such as elevation, meteorological data, remote sensing satellite data, such as data related to temperature and moisture, plant genetic data, plant productivity data, irrigation data, lodging and disease response data and moisture content data and other crop data.

The system of the present invention can be described as computer program with a data pool organized as a plurality of relational databases that contain data contributed by data contributors such as foundation seed companies, private plant breeding programs and genetic testing entities. Extraction of the data is the resulting benefit as more data is accessible to a particular user than was contributed by that user, while the contributors maintain control over which other users have access to their proprietary data. Genetic suppliers can also gain more exposure for their products while having the choice to generate income from proprietary data. Data contributors can maintain current data access without modifying present software.

Data is contributed in a consistent format of the contributor's choosing, and is held in a consistent manner across all contributors. This data is extracted in the same consistent format as contributed, which may be unique to the contributor. Data contributors control which other contributors or data extractors may have access to their data, and data contributors may extract more or less data than they contribute. In fact, approved data extractors may extract as much data as desired. Typically, data contribution and extraction is recorded with credits earned and charges billed for use in relation to contribution.

Generally, the present invention is intended to be capable of including data from any and all genetic developers, including foundation seed companies and private breeding programs.

Figure 2A:
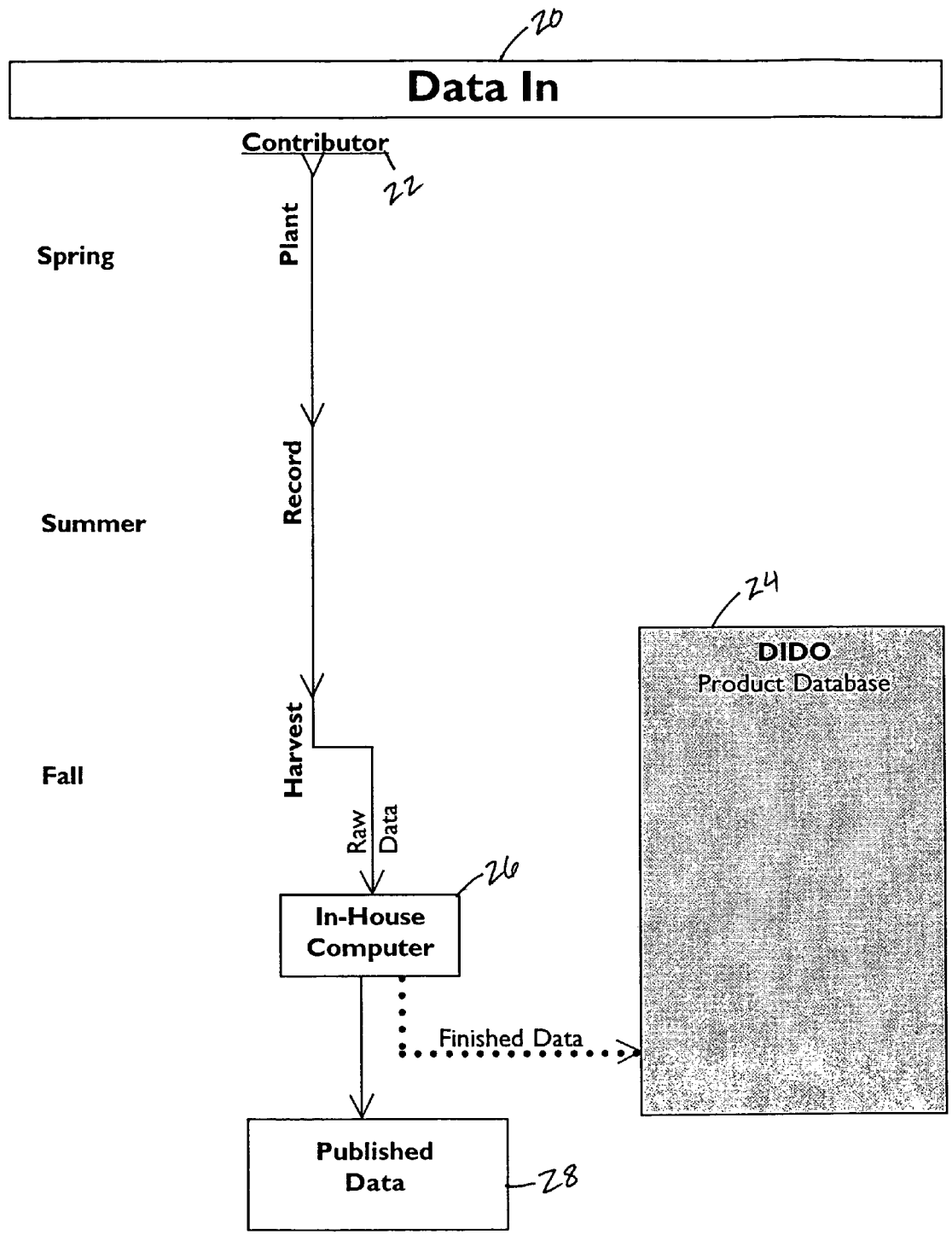
FIG. 2A is a flow diagram showing the flow of data into the system of the present invention in accordance with another embodiment of the present invention.

FIG. 2A is a flow diagram showing the flow of data into the system of the present invention. At least one data contributor inputs data into their in-house computer. Finished data is then input into the product database of the system of the present invention, which can organize and analyze the data. The raw data from the data contributor may also be published by the data contributor. The in-house computer of a data contributor is capable of communicating or transferring data to the server of the present invention.

A private breeding program determines what products to test and where to test them. In-house systems for plot design, seed counting, envelope labeling, planting order, planting equipment, etc. are utilized without any modification. The test plot is planted. The latitude and longitude of the site is documented. Sites may be documented with a GPS device, using the WGS 84 system in the degrees decimal format, for example, 39.45388 degrees north latitude. The corner of the test plot is recorded as well as the distance to the right and left corners while facing the center of the test plot. The latitude and longitude are recorded in the data contributor's database and forwarded to the system at any time. From the ZIP Codes of the latitude-longitude coordinates, the product database system maintains the relationship between the ZIP Code and the geographic area being described. A desirable geographic breakdown is thus created of the test plots. It is also possible to create geographic areas and use latitude-longitude coordinates directly to determine in which territory a particular point of a certain latitude and longitude is located.

During the growing season the private breeding program collects and records data in a manner cognizant of the data fields within the system of the present invention. The system creates and ties data to the latitude and longitude during the growing season and enters it into the system. During the harvest season, the data contributor collects and records raw data from harvesters, which often have computerized measuring devices and yield measuring equipment, and any other method the data contributor uses in a normal sequence of product testing to determine the characteristics of a particular plant product. The raw data is entered into the data contributor's in-house computer and compiled into a finished format. The finished data is then forwarded to the system, including the initial latitude and longitude per site in a consistent format predetermined by the system and the data contributor. The system then compiles the contributed data, incorporating it into a database, including with it the appropriate limits of the identities of the persons and entities who have access to the data. After the volume of the contributed data is measured and documented, it is added to the contributor's account. A data contributor may request data to be extracted from the system in a "usual format" which may include yield, moisture, lodging and other possible crop details, or it may ask for data in an "enhanced format." The enhanced format includes additional information such as site information, geographic information, weather variables, soil characteristics, etc. Again the private breeding program's account is adjusted to reflect the volume of data extracted. Access to the data can be different for each extracting entity according to the various contributors' desires. The extracted data is then incorporated into the extractor's in-house computer system and analyzed as desired. As another example, the enhanced format may include such further data as enhanced soil type determination data that is enhanced by exporting latitude and longitude information, or other geographic mapping information data from the contributor to the soil survey map. The latitude and longitude are exported from the contributor to the electronic processing system, wherein the enhanced data is created.

Figure 2B:
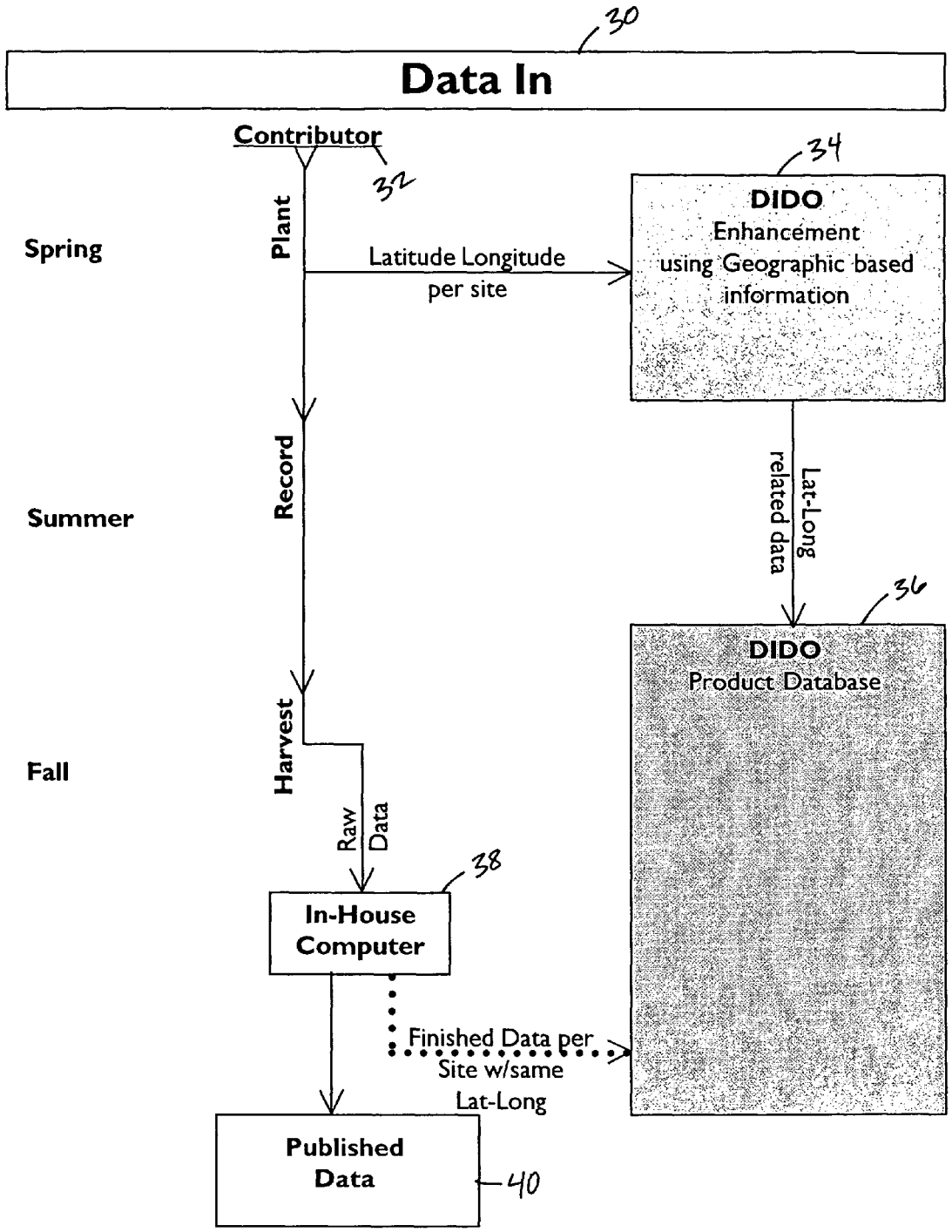
FIG. 2B is a flow diagram showing the flow of data into the system of the present invention in accordance with an embodiment of the present invention.

FIG. 2B is a flow diagram showing the flow of data into the system of the present invention in accordance with an enhanced embodiment of the present invention. In this embodiment, the at least one data contributor inputs latitude and longitude data per test site into the enhancement portion of the system (latitude and longitude database). This latitude and longitude data is the input into the product database of the system of the present invention.

The at least one data contributor may also input their raw data into their in-house computer. The finished data is then input into the product database of the system of the present invention, which is combined with the latitude and longitude data. The raw data from the in-house computer of the data contributor may also be published by the data contributor.

Further, the system includes a geographic data mapping system that is used for receiving, transmitting and storing geographic data. The system also includes at least one electronic processing system for receiving empirical data and geographic data and creating enhanced data using the empirical and geographic data, at least one electronic product database system, for transmitting and storing enhanced data; and at least one electronic extractor station having a second storage system for receiving and storing the enhanced data from the product database.

Additional data is added to normal test plot results by documenting the latitude and longitude of the test sites. With highly accurate test site determination many valuable environmental factors can be directly connected to the test results. Ease of use is maintained by providing data back to a contributor in the format the data was provided. Thus, the data contributor is not required to abandon an expensive in-house data system. Ease of use at the extractor/contributor level is achieved by providing enhanced data in a consistent format.

The present invention provides a method for determining plant genetic variability by gathering empirical data related to plant productivity and mapping that data with geographic data. The present invention includes a method of determining plant genetic variability by gathering data related to plant growing conditions, mapping that data with the geographic data and obtaining a Plant Variability Quotient ("PVQ") that is dependent on the plant productivity data and the geographic data. PVQ is useful for determining which varieties of plant will grow best under what geographical location and plant growing condition.

Figure 3:
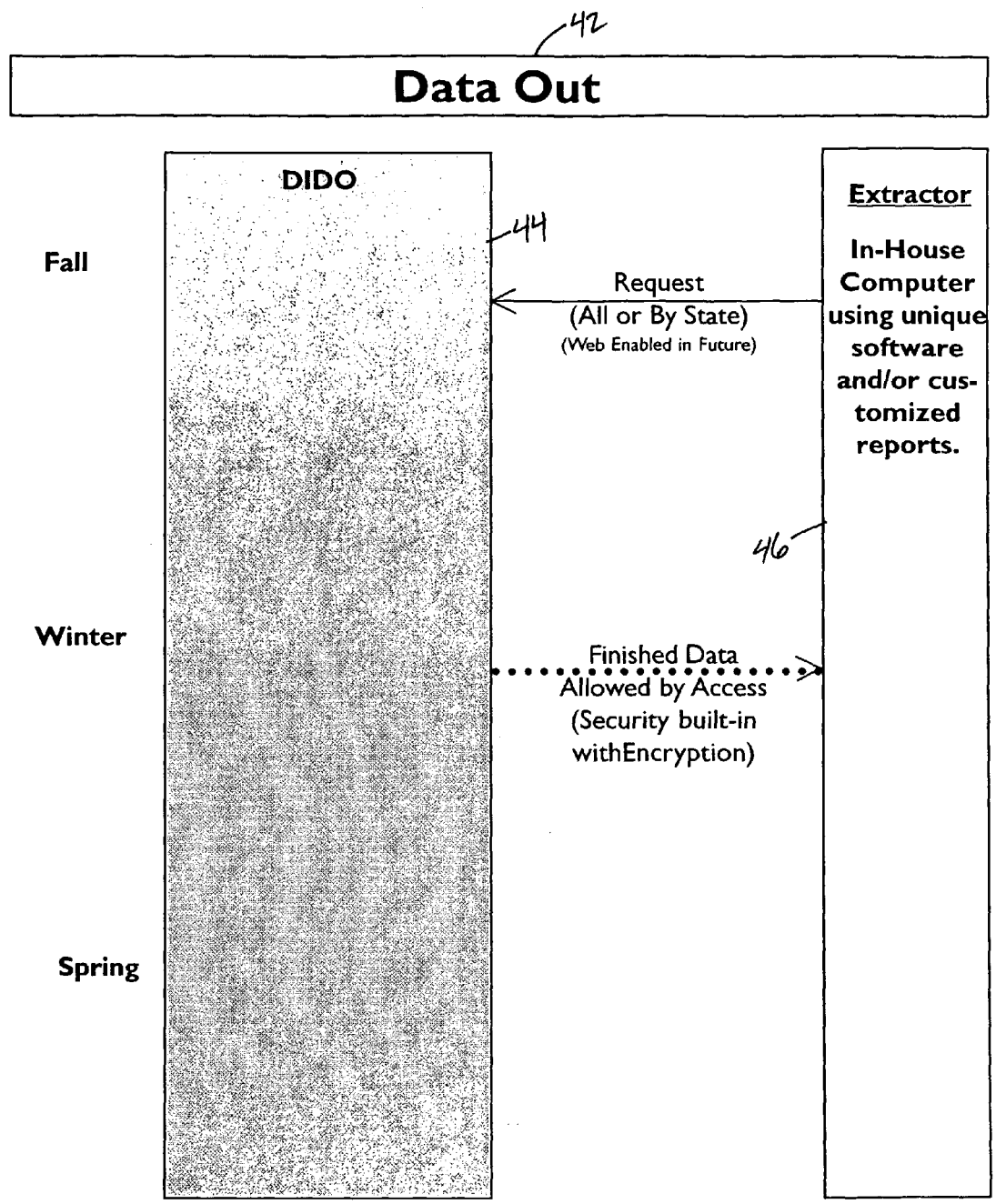
FIG. 3 is a flow diagram showing the flow of data out of the system of the present invention.

FIG. 3 is a flow diagram showing the flow of data out of the system of the present invention. A data extractor may request data out of the system per state or all states. The extractor would use their in-house computer to access the server, Web site, etc., or use CDs or DVDs supplied by the owner of the system. A data contributor may limit access by a data extractor. Also, security is built into the computer system of the present invention through changing passwords, encryption, etc.

Figure 4:
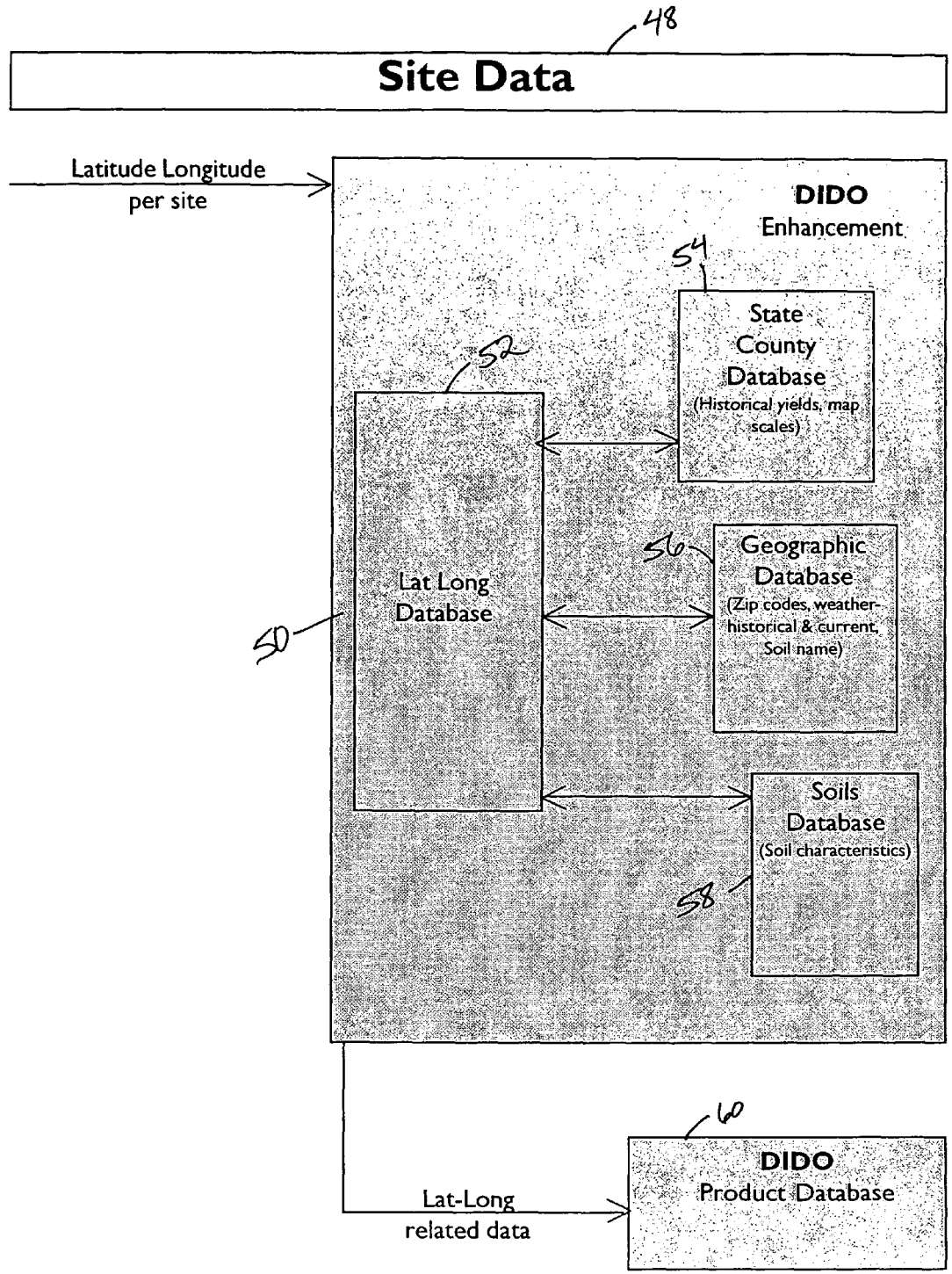
FIG. 4 is a flow diagram showing the testing site data being input into the system of the present invention.

FIG. 4 is a flow diagram showing the testing site data being input into the system of the present invention. The databases related to the enhancement portion of the system include the latitude and longitude database, the state county database, the geographic database and the soils database. These are relational databases that input the latitude and longitude related data to the main product database.

A combination of latitude and longitude is the tying field between related databases concerning site information. The pedigree of the tested product becomes the code between other related databases that includes data about the tested product. Contributors are recorded with direct notation of what other entities may have access to the contributor's data. Passwords per authentication device are maintained with the present invention's ability to cut off anyone with access at a moment's notice.

Figure 5:
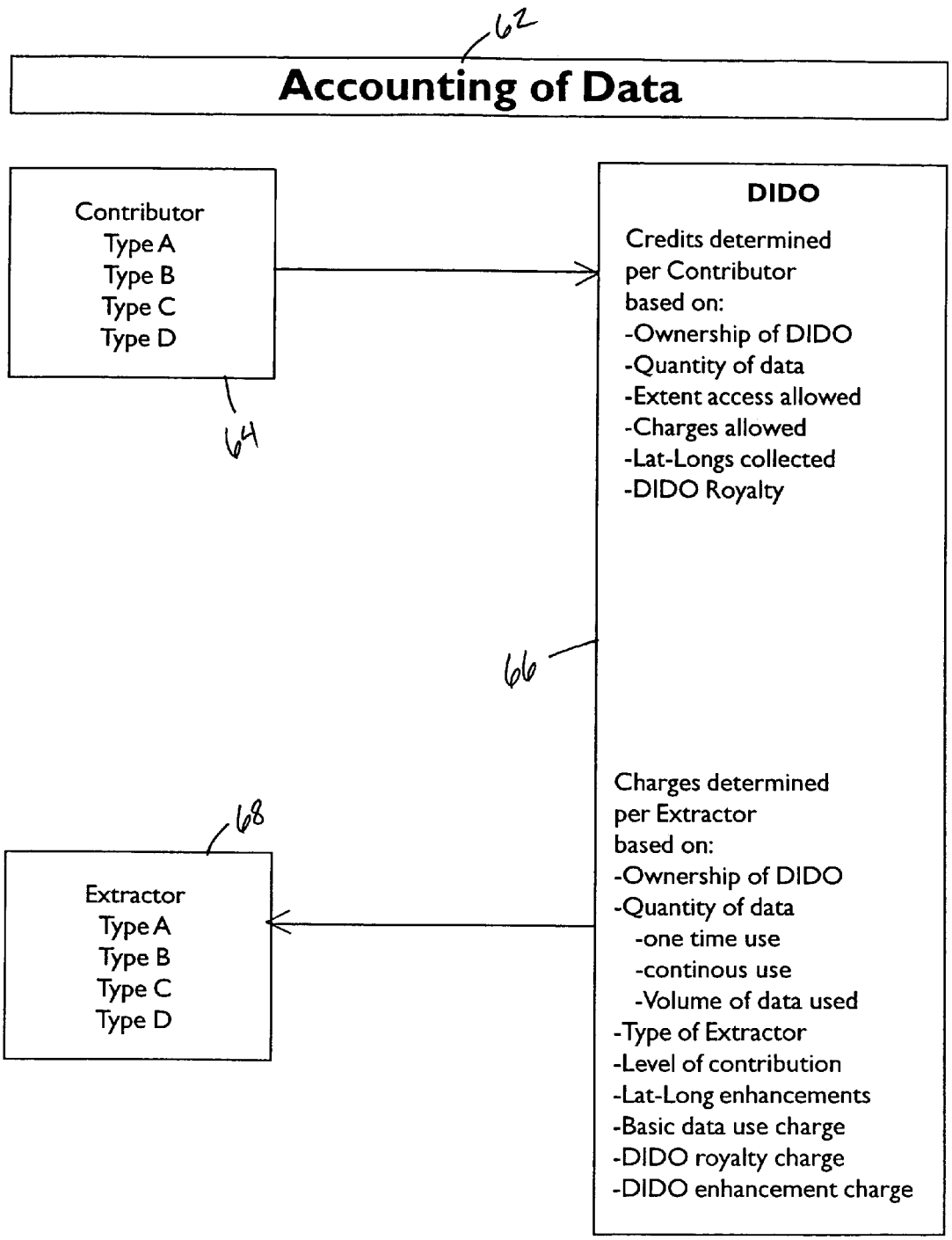
FIG. 5 is a flow diagram showing accounting measures built into the system of the present invention for crediting accounts of data contributors and charging accounts of data extractors.

FIG. 5 is a flow diagram showing accounting measures built into the system of the present invention for crediting accounts of data contributors and charging accounts of data extractors. Credits may be determined based on ownership, the amount of data contributed, the extent access is allowed to their data, charges allowed, latitudes and longitudes collected, and royalties. Charges may be determined based on ownership, the amount of data extracted, the type of extractor, the level of contribution, latitude and longitude enhancements, data use charges, royalty charges, and enhancement charges.

The present invention will allow the data contributors to collect royalties from data extractors. And the owners of the system will possibly receive compensation from data extractors to view their data.

FIG. 6 is an example of an access control worksheet to be filled out by each data contributor and input into the system for limiting access by data extractors to the data contributor's data. For access control, the data contributors must check boxes for access of their data. Access control is granted by the contributor of the data.

Figure 7:
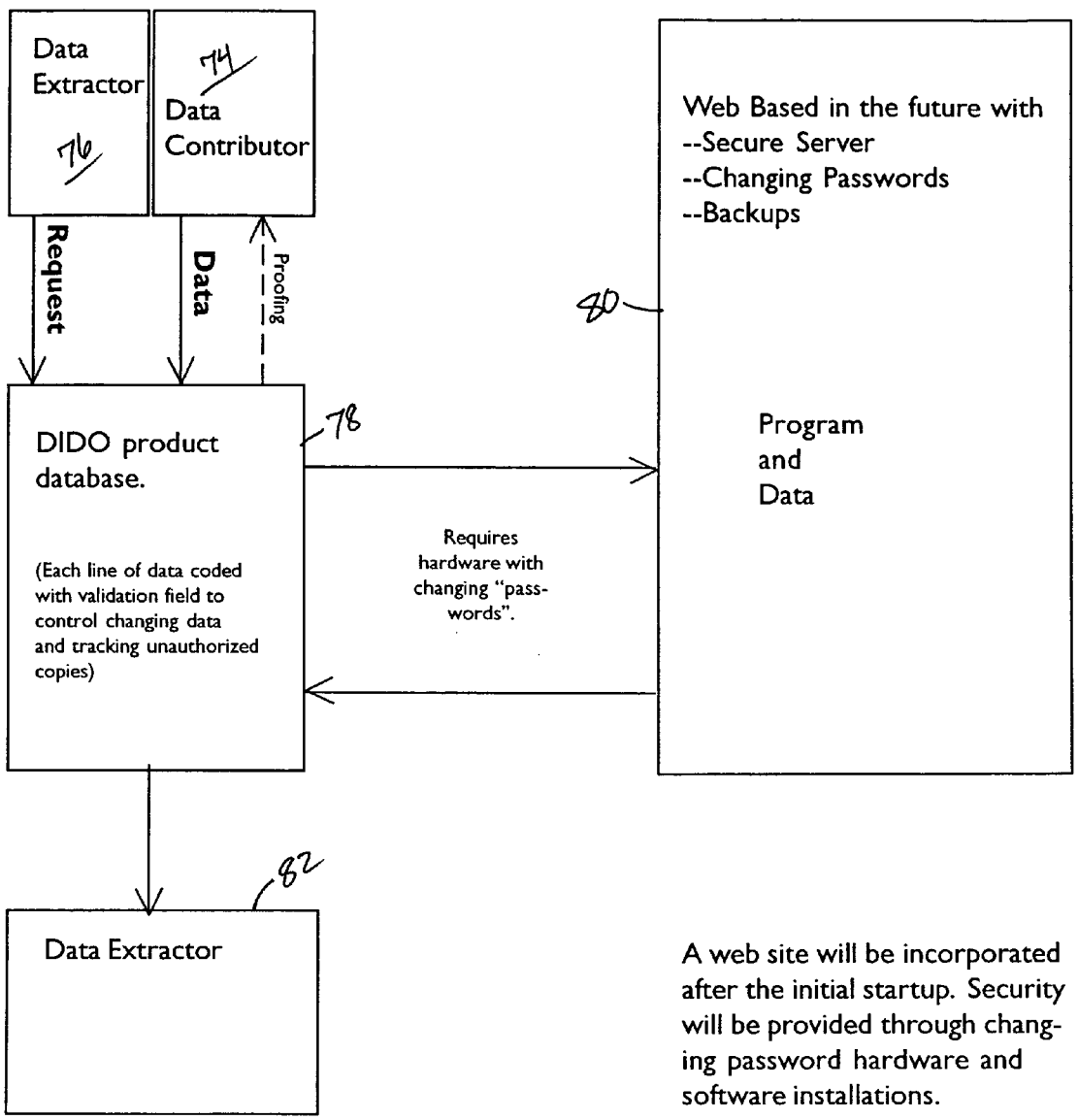
FIG. 7 is a flow diagram showing security measures built into the system of the present invention.

FIG. 7 is a flow diagram showing security measures built into the system of the present invention. Extreme security surrounds the process of inputting and outputting data in order to gain the confidence of contributors and data extractors through the use of software and/or hardware using often changeable passwords, as often as every minute or more. Any suitable security measure may be used to enhance the security features and restrict access of the data to and from the contributors and extractors. Examples of security measures implemented in the system of the present invention include encryption, certification, passwords, backups and invisible characters, etc. The present invention may also be a Web-based system with a secure server.

The server will be housed at a third party site under the present invention's control. Accounts are maintained per entity to record usage of data moving in and/or out of the present invention. Charges will vary depending on volume, ownership status, type of entity, and other appropriate considerations. Data can be forwarded from the invention in various formats depending on the volume and desires of the extracting entity.

FIGS. 8A, 8B and 8C provide listings of the fields in the databases in the system of the present invention. There are numerous fields that may be inputted at the contributor station including field separators, valid states in which the fields are located, valid values applicable for that field, statistics related to the contributor's affiliation, such as the company information, various login attempts, license agreement, company's vital statistics, brand names of companies and their data specifications, location information and location permissions, variety information and variety permissions, hybrid names and pedigree information.

Figure 9:
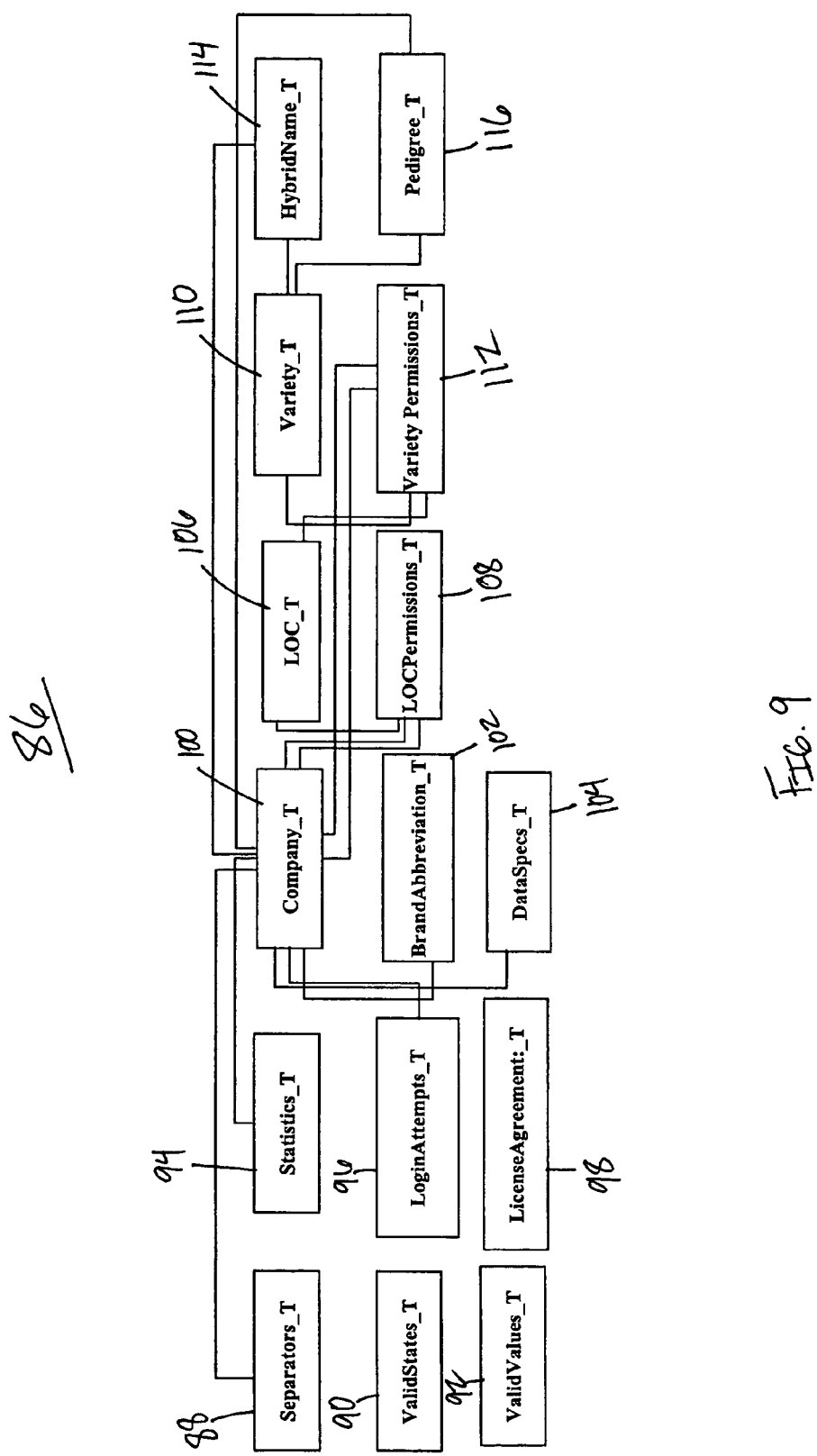
FIG. 9 is a diagram illustrating the databases of the system of the present invention.

FIG. 9 is a diagram illustrating the databases of the system of the present invention. FIG. 9A is a diagram illustrating the fields within the Separators, ValidStates and ValidValues databases of the system of the present invention. FIG. 9B is a diagram illustrating the fields within the Statistics, LoginAttempts and LicenseAgreement databases of the system of the present invention. FIG. 9C is a diagram illustrating the fields within the Company database of the system of the present invention. FIG. 9D is a diagram illustrating the fields within the BrandAbbreviation and DataSpecs databases of the system of the present invention. FIG. 9E is a diagram illustrating the fields within the LOC database of the system of the present invention. FIG. 9F is a diagram illustrating the fields within the LOCPermissions database of the system of the present invention. FIG. 9G is a diagram illustrating the fields within the Variety database of the system of the present invention. FIG. 9H is a diagram illustrating the fields within the VarietyPermissions database of the system of the present invention. FIG. 9J is a diagram illustrating the fields within the HybridName and Pedigree databases of the system of the present invention.

Data input into the databases of the system of the present invention may include company information, location site information, location permissions that controls access, variety information related to test plot information, variety permissions that controls access, a brand abbreviation that includes unique format record of the contributor, a data specification which is internal to the program, statistics related to importing and exporting activity, login attempts to monitor activity of users, an identification of the license agreement, which is used at sign on for security reasons, separators related to pedigree characters, valid states related to internal gross error checking and valid values related to internal gross error checking. Persons of ordinary skill in the art, may however modify, add or alter these sets of information according to their particular needs.

In general, one of the best uses of the invention is to contribute data and then extract data that has been enhanced with additional site information. By sorting and summarizing the enhanced data with in-house software and its uniqueness in data presentation, better product selection, product recommendations and product understanding can be arrived at more quickly than competing entities. The invention is best utilized further by choosing testing sites that reflect the greatest percentage of a user's customers. Additional connecting codes between related databases either in the system or in-house computer can classify an entity's customer that is compatible with product data results. Highly accurate product recommendations backed by concurrent environmental conditions will give the entity using the present invention a competitive advantage over other entities.

The present invention allows queries or sorts to be made based on fields never before available. It allows the matching of seed company customer's environmental growing conditions to product testing conditions. The present invention also documents the geographies of the testing sites as well as the geographies of the customers, so the seed company can go out and make product recommendations to their customers, based on the customer's data.

While the invention has been described with reference to preferred embodiments, it is to be understood that the invention is not intended to be limited to the specific embodiments set forth above. Thus, it is recognized that those skilled in the art will appreciate that certain substitutions, alterations, modifications, and omissions may be made without departing from the spirit or intent of the invention. Accordingly, the foregoing description is meant to be exemplary only, the invention is to be taken as including all reasonable equivalents to the subject matter of the invention, and should not limit the scope of the invention set forth in the following claims.

What is claimed is:

1. A plant variability determining system, comprising:
   at least one electronic contributor station having a first storage system for receiving and storing empirical data related to plant growing conditions;
   a geographic data mapping system for receiving, transmitting and storing geographic data;
   at least one electronic processing system for receiving empirical data and geographic data and creating enhanced format data using the empirical data and the geographic data;
   at least one electronic product database system, for transmitting and storing enhanced format data; and
   at least one electronic extractor station having a second storage system for receiving and storing the enhanced format data from the product database.

2. A system according to claim 1, wherein the product database is coupled with a security system to restrict access from the extractor station.

3. A method of determining plant genetic variability, comprising the steps of:
   gathering empirical data related to plant growing conditions;
   mapping the empirical data with geographical data; and
   determining a Plant Variability Quotient (PVQ), wherein the PVQ is dependent on empirical data and the geographic data.

4. A method according to claim 3, wherein the empirical data related to plant growing conditions is selected from the group consisting of soil conditions data, soil gradient data, topological data, meteorological data, remote sensing satellite data, plant genetic data, plant productivity data, irrigation data, lodging and disease response data, and grain moisture content data.

5. A method according to claim 3, wherein the geographic data is obtained from a global positioning system ("GPS") capable of ascertaining position in terms of latitudes and longitudes.

6. A method according to claim 3, wherein the geographic data includes ZIP codes.

* * * * *